United States Patent
Lai et al.

(10) Patent No.: US 9,711,773 B2
(45) Date of Patent: Jul. 18, 2017

(54) SEPARATOR AND LITHIUM-ION SECONDARY BATTERY

(71) Applicant: Dongguan Amperex Technology Limited, Dongguan (CN)

(72) Inventors: Xulun Lai, Dongguan (CN); Hui Jiang, Dongguan (CN); Jianrui Yang, Dongguan (CN); Kejun Zhan, Dongguan (CN); Lei Niu, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 72 days.

(21) Appl. No.: 14/584,730

(22) Filed: Dec. 29, 2014

(65) Prior Publication Data

US 2015/0333309 A1 Nov. 19, 2015

(30) Foreign Application Priority Data

May 14, 2014 (CN) .......................... 2014 1 0204287

(51) Int. Cl.
*H01M 2/16* (2006.01)
*H01M 10/0525* (2010.01)
(Continued)

(52) U.S. Cl.
CPC ......... *H01M 2/1686* (2013.01); *H01M 2/145* (2013.01); *H01M 2/1653* (2013.01);
(Continued)

(58) Field of Classification Search
CPC .. H01M 2/16; H01M 10/0525; H01M 2/1686; H01M 2220/30; H01M 2/18; H01M 2/145; H01M 2/1653
See application file for complete search history.

(56) References Cited

U.S. PATENT DOCUMENTS

| | | | |
|---|---|---|---|
| 2009/0136816 A1* | 5/2009 | Kang | B01J 13/22 429/502 |
| 2010/0261065 A1* | 10/2010 | Babinec | H01M 2/166 429/246 |

(Continued)

FOREIGN PATENT DOCUMENTS

| | | |
|---|---|---|
| CN | 101444710 | 6/2009 |
| CN | 102318124 | 1/2012 |

OTHER PUBLICATIONS

Copolymerization|Definition of Copolymerization by Merriam-Webster, p. 1.*

(Continued)

*Primary Examiner* — Emily Le
*Assistant Examiner* — Seenam Agbetiafan
(74) *Attorney, Agent, or Firm* — Morgan, Lewis & Bockius LLP

(57) ABSTRACT

The present disclosure provides a separator and a lithium-ion secondary battery. The separator comprises: a microporous membrane having micropores; and a coating provided on a surface of the microporous membrane. The coating comprises polymer particles and binder particles. The polymer particle is a hollow shell structure which comprises a shell and a cavity positioned in the shell, an outer surface of the shell is distributed with nanopores which are communicated with the cavity, a particle diameter of the polymer particle is larger than a pore size of the micropore of the microporous membrane; a particle diameter of the binder particle is larger than the pore size of the micropore of the microporous membrane. The lithium-ion secondary battery comprises: a positive electrode plate; a negative electrode plate; the aforementioned separator interposed between the positive electrode plate and the negative electrode plate; and an electrolyte.

18 Claims, 3 Drawing Sheets

(51) Int. Cl.
*H01M 2/18* (2006.01)
*H01M 2/14* (2006.01)
*H01M 10/42* (2006.01)
*H01M 10/052* (2010.01)

(52) U.S. Cl.
CPC ......... *H01M 2/18* (2013.01); *H01M 10/0525* (2013.01); *H01M 10/4235* (2013.01); *H01M 10/052* (2013.01); *H01M 2220/30* (2013.01)

(56) References Cited

U.S. PATENT DOCUMENTS

| | | | | |
|---|---|---|---|---|
| 2011/0293989 | A1* | 12/2011 | Hasegawa | C08J 5/18 |
| | | | | 429/144 |
| 2012/0301774 | A1* | 11/2012 | Jiang | H01M 2/145 |
| | | | | 429/144 |
| 2013/0252066 | A1* | 9/2013 | Yeou | H01M 2/166 |
| | | | | 429/144 |

OTHER PUBLICATIONS

EG&G Technical Services, Inc., Fuel Cell Handbook (Seventh Edition), U.S. Department of Energy Office of Fossil Energy, National Energy Technology Laboratory, West Virginia, Nov. 2004, 427 pgs.

\* cited by examiner

SEPARATOR AND LITHIUM-ION SECONDARY BATTERY

CROSS-REFERENCE TO RELATED APPLICATIONS

The present application claims priority to Chinese patent application No. 201410204287.X, filed on May 14, 2014, which is incorporated herein by reference in its entirety.

FIELD OF THE PRESENT DISCLOSURE

The present disclosure relates to a field of a battery technology, and more specifically to a separator and a lithium-ion secondary battery.

BACKGROUND OF THE PRESENT DISCLOSURE

Since the lithium-ion secondary battery has been commercialized, due to advantages, such as a high energy density, a high operating voltage, none memory effect and the like, the lithium-ion secondary battery is widely used as a power supply for various mobile devices. With large scale applications of the lithium-ion secondary battery, the cycle life and the safety problem of the lithium-ion secondary battery are increasing significantly.

The lithium-ion secondary battery mainly comprises a positive electrode plate, a negative electrode plate, a separator and an electrolyte. The separator is provided between the positive electrode plate and the negative electrode plate, and mainly functions to: (1) physically isolate the positive electrode plate and the negative electrode plate of the lithium-ion secondary battery so as to prevent an interior short circuit between the positive electrode plate and the negative electrode plate; (2) ensure the lithium ions to pass the electrolyte uniformly and move back and forth freely between the positive electrode plate and the negative electrode plate; (3) absorb the electrolyte and keep the electrolyte to make the lithium-ion secondary battery have a longer cycle life.

At present, most of the separators used in the lithium-ion secondary battery are polyolefin membranes, such as polyethylene (PE) membrane, polypropylene (PP) membrane or polypropylene/polyethylene/polypropylene (PP/PE/PP) composite membrane, when the lithium-ion secondary battery is abused (such as overcharge, thermal shock or puncture and the like), the temperature of the lithium-ion secondary battery generally will rise to be equal to or more than 90° C., once the interior temperature of the lithium-ion secondary battery is more than 90° C., the conventional polyethylene (PE) membrane or polypropylene (PP) membrane will have a more serious thermal shrinkage, a short circuit would be established between the positive electrode plate and the negative electrode plate and more heat would be generated, the lithium-ion secondary battery would be easily fired or even exploded. Furthermore, a surface tension of the polyolefin membrane is too low, the polyolefin membrane has too poor infiltration capability and absorption capability on the carbonate electrolyte used in the lithium-ion secondary battery, and can not meet the requirement of a longer cycle life of the lithium-ion secondary battery.

Regarding this situation, a known manner is performed so that a ceramic layer is coated onto the separator so as to reduce the thermal shrinkage and prevent the short circuit between the positive electrode plate and the negative electrode plate and improve the infiltration capability of the separator on the electrolyte. However, the main material of the ceramic layer generally comprises ceramic particles with a very high hardness such as aluminum oxide and the like, which will increase the wear of the coating machine and the cutting machine, and increase the production cost, and has a limited ability to increase the retention performance on the electrolyte, and cannot meet the requirement of a longer cycle life of the lithium-ion secondary battery, and also can not achieve a better inhibitory effect on the abused situations such as overcharge and the like. The reason is that when the lithium-ion secondary battery is abused, although the ceramic layer may reduce the heat shrinkage of the separator, the ceramic layer can not prevent the temperature of the lithium-ion secondary battery from increasing until the separator is melt, and the integrity of the ceramic layer will also be damaged, the short circuit between the positive electrode plate and the negative electrode plate occurs, finally the lithium-ion secondary battery will be fired or even exploded. Moreover, since the ceramic particle has a solid structure, the retention performance of the ceramic layer on the electrolyte is limited.

SUMMARY OF THE PRESENT DISCLOSURE

In view of the problems existing in the background technology, an object of the present disclosure is to provide a separator and a lithium-ion secondary battery, the separator has a higher liquid absorption amount, a higher ionic conductivity and a lower heat shrinkage ratio, so that the lithium-ion secondary battery has a better room temperature cycle performance, a better low temperature discharge performance, a better rate performance and a better safety performance.

In order to achieve the above objects, in a first aspect of the present disclosure, the present disclosure provides a separator which comprises: a microporous membrane having micropores; and a coating provided on a surface of the microporous membrane. The coating comprises: polymer particles, the polymer particle is a hollow shell structure and comprises a shell and a cavity positioned in the shell, an outer surface of the shell is distributed with nanopores which are communicated with the cavity, a particle diameter of the polymer particle is larger than a pore size of the micropore of the microporous membrane; and binder particles, a particle diameter of the binder particle is larger than the pore size of the micropore of the microporous membrane.

In a second aspect of the present disclosure, the present disclosure provides a lithium-ion secondary battery which comprises: a positive electrode plate; a negative electrode plate; a separator interposed between the positive electrode plate and the negative electrode plate; and an electrolyte. The separator is the separator according to the first aspect of the present disclosure.

The present disclosure has following beneficial effects:

The separator using the above configuration has a higher liquid absorption amount, a higher ionic conductivity and a lower heat shrinkage ratio, so that the lithium-ion secondary battery has a better room temperature cycle performance, a better low temperature discharge performance, a better rate performance and a better safety performance.

DETAILED DESCRIPTION

Figure 1:
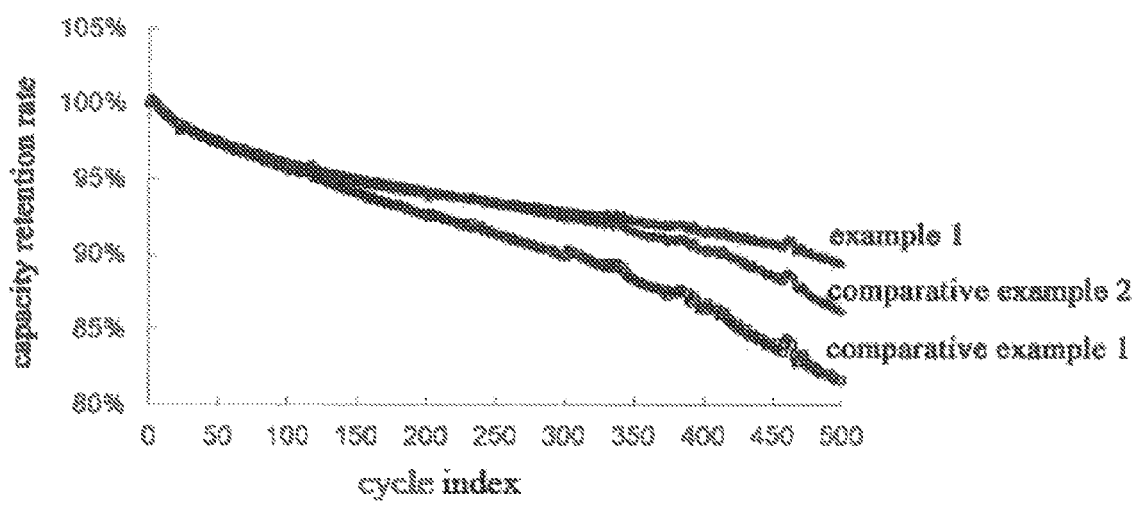
FIG. 1 was a diagram illustrating room temperature cycle performances of lithium-ion secondary batteries of example 1, comparative example 1 and comparative example 2.
Figure 2:
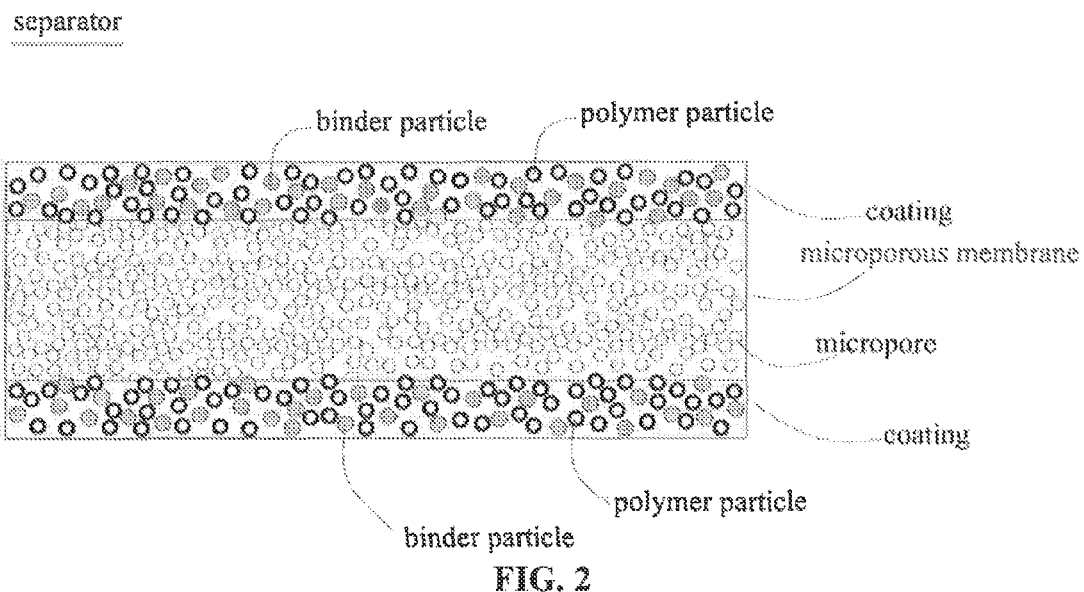
FIG. 2 is a cross sectional schematic view of a separator of the present invention.
Figure 3:
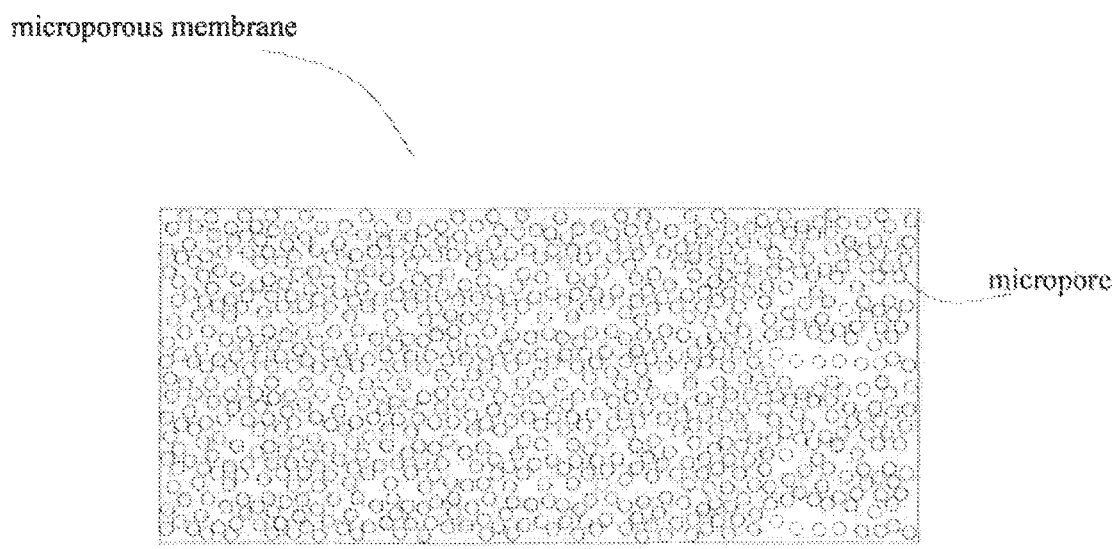
FIG. 3 is a top view of a microporous membrane of the separator in FIG. 1.
Figure 4:
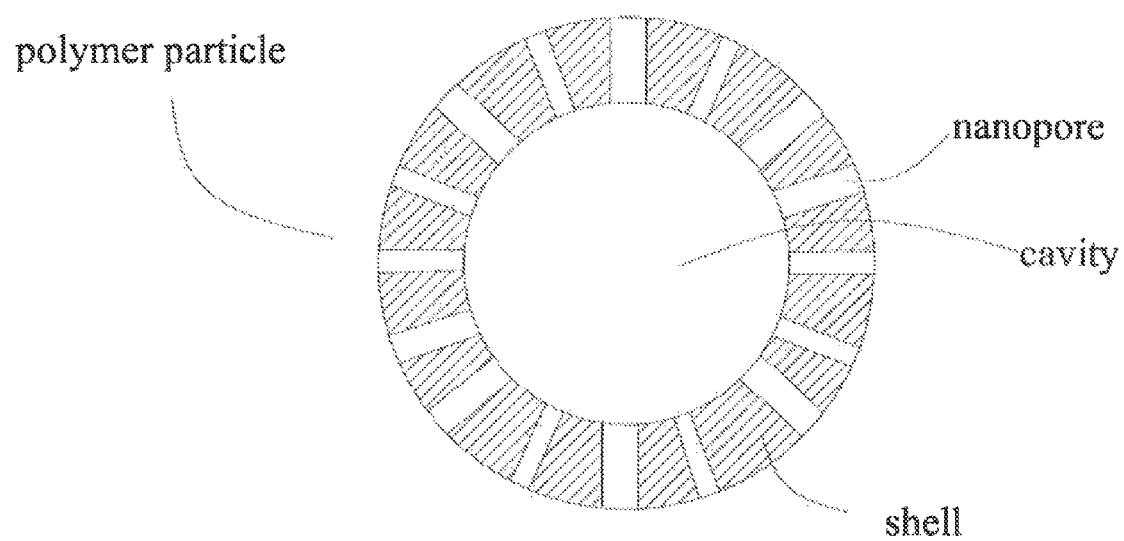
FIG. 4 is a cross sectional schematic view of a polymer particle in FIG. 1.
Figure 5:
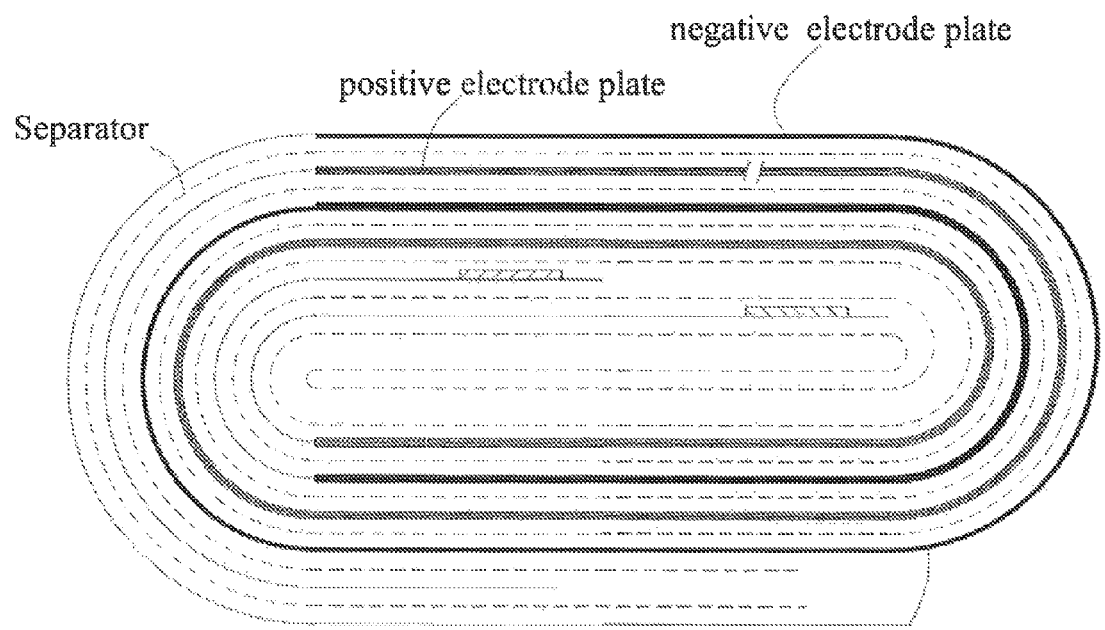
FIG. 5 is a cross sectional schematic view of a lithium-ion secondary battery of the present invention.

Hereinafter a separator and a preparation method thereof and a lithium-ion secondary battery and examples, comparative examples and test results according to the present disclosure will be described in detail.

Firstly, a separator according to a first aspect of the present disclosure will be described.

The separator according to the first aspect of the present disclosure comprises: a microporous membrane having micropores; and a coating provided on a surface of the microporous membrane. The coating comprises: polymer particles, the polymer particle is a hollow shell structure and comprises a shell and a cavity positioned in the shell, an outer surface of the shell is distributed with nanopores which are communicated with the cavity, a particle diameter of the polymer particle is larger than a pore size of the micropore of the microporous membrane; and binder particles, a particle diameter of the binder particle is larger than a pore size of the micropore of the microporous membrane.

In the separator according to the first aspect of the present disclosure, when the separator is applied into the lithium-ion secondary battery, the electrolyte of the lithium-ion secondary battery may enter into the cavity of the polymer particle via the channel of the nanopore on the outer surface of the shell of the polymer particle, so that the liquid retention amount of the separator is greatly increased, the cycle life of the lithium-ion secondary battery is lengthened, and a high-current capacity and a low temperature discharge capacity is strengthened at the same time; that the coating comprises polymer particles and binder particles not only reduces the heat shrinkage of the separator, but also improves safety performance of the lithium-ion secondary battery.

In the separator according to the first aspect of the present disclosure, the microporous membrane may be selected from one of polyethylene (PE) membrane, polypropylene (PP) membrane, polypropylene/polyethylene/polypropylene (PP/PE/PP) composite membrane, cellulose membrane, polyethylene terephthalate (PET) membrane, and polyimide (PI) membrane.

In the separator according to the first aspect of the present disclosure, a thickness of the microporous membrane may be 3 μm~35 μm.

In the separator according to the first aspect of the present disclosure, a thickness of the coating may be 0.5 μm~6 μm. If the thickness of the coating is too small, the coating can not play a function of reducing the shrinkage of the separator; if the thickness of the coating is too big, the passage efficiency of the lithium ions is affected to a certain extent when the lithium-ion secondary battery is normally used, and in turn room temperature cycle performance and rate performance of the lithium-ion secondary battery are affected.

In the separator according to the first aspect of the present disclosure, a porosity of the microporous membrane may be 30%~75%.

In the separator according to the first aspect of the present disclosure, the polymer used in the polymer particles may be copolymer.

In the separator according to the first aspect of the present disclosure, the polymer particle may be formed by copolymerizing at least two monomers selected from styrene, acrylic acid, methacrylic acid, methyl styrene, vinyl toluene, methyl acrylate, isobutyl acrylate, n-octyl acrylate, vinyl acrylate, cyclohexyl methacrylate, 2-hydroxyethyl methacrylate, 2-hydroxypropyl methacrylate, n-butyl methacrylate, ethyl methacrylate, and methyl methacrylate. The polymer particle formed by these copolymers may reduce the heat shrinkage of the separator, the distribution of the particle diameter of the polymer particle formed by these copolymers is narrower, and the polymer particle is cheaper than the ceramic particle.

The above polymer particle and a preparation method thereof may refer to U.S. Pat. No. 5,157,084, issued on Oct. 20, 1992, and U.S. Pat. No. 4,427,836, issued on Jan. 24, 1984.

In the separator according to the first aspect of the present disclosure, a glass transition temperature (Tg) of the polymer particle may be 95° C.~125° C. The glass transition temperature of the microporous membrane is lower, the microporous membrane is softer and is easily punctured by a lithium dendrite; but the glass transition temperature of the polymer particle on the surface of the microporous membrane is higher, the separator has a higher hardness and is not easily punctured by the lithium dendrite, which is able to reduce the self-discharge of the lithium-ion secondary battery and the safety problem of the lithium-ion secondary battery resulted from the puncture of the separator by the lithium dendrite. Furthermore, when the lithium-ion secondary battery is abused, strong oxidation reaction between the electrolyte and the positive electrode plate occurs, the temperature of the lithium-ion secondary battery will rapidly rise to be equal to or more than 90° C., and the polymer particle may reduce the heat shrinkage of the separator to a certain extent, also the nanopores on the surface of the shell of the polymer particle will be closed once the temperature is equal to or more than the glass transition temperature of the polymer particle, after the nanopores are closed, the electrolyte will be sealed in the cavity of the polymer particle, thereby further cutting off the oxidation reaction between the positive electrode plate and the electrolyte, and ensuring that the lithium-ion secondary battery will not be fired or exploded.

In the separator according to the first aspect of the present disclosure, a thermal decomposition temperature of the polymer particle may be more than 300° C.

In the separator according to the first aspect of the present disclosure, the pore size of the micropore of the microporous membrane may be 35 nm~800 nm.

In the separator according to the first aspect of the present disclosure, the particle diameter of the polymer particle may be 50 nm~900 nm.

In the separator according to the first aspect of the present disclosure, the particle diameter of the binder particle may be 60 nm~1000 nm.

In the separator according to the first aspect of the present disclosure, the particle diameter of the polymer particle may allow at least 5% and less than 50% of a volume of the polymer particle to be embedded into the micropore of the microporous membrane. When the embedded volume is too small, the contact area between the nanopore on the outer surface of the shell of the polymer particle and the micropore on the surface of the microporous membrane is too small, and the ionic conductivity of the separator is reduced; when the embedded volume is too large, the liquid retention performance of the micropore itself on the surface of the microporous membrane is reduced and therefore the ionic conductivity of the separator is reduced.

In the separator according to the first aspect of the present disclosure, an area of the nanopores distributed on the outer surface of the shell of the polymer particle may be 10%~50% of the outer surface area of the shell, that is the porosity of the shell may be 10%~50%.

In the separator according to the first aspect of the present disclosure, taking a thickness of the shell of the polymer particle as a length of a channel of the nanopore, the pore size of the nanopore may be 20%~50% of the thickness of the shell of the polymer particle. If the ratio of the pore size and the channel of the nanopore is too large, a capillary action of the nanopore is relatively small, and a liquid absorption amount of the cavity is not enough; if the ratio of the pore size and the channel of the nanopore is too small, the capillary action of the nanopores is obvious, but the liquid absorption time is relatively long.

In the separator according to the first aspect of the present disclosure, the pore size of the nanopore may be 10 nm~30 nm.

In the separator according to the first aspect of the present disclosure, the binder particle may be selected from at least one of styrene-acrylate latex particle, acrylic latex particle, and styrene-butadiene latex particle.

In the separator according to the first aspect of the present disclosure, a mass of the polymer particle may be 70%~98% of a mass of the coating.

In the separator according to the first aspect of the present disclosure, the mass of binder particle may be 2%~30% of the mass of the coating.

Secondly, a preparation method of a separator according to a second aspect of the present disclosure will be described.

A preparation method of a separator according to a second aspect of the present disclosure for preparing the separator according to the first aspect of the present disclosure, comprises steps of: adding the polymer particles and the binder particles into a solvent, then stirring uniformly to obtain a coating slurry; coating the coating slurry on at least one surface of the microporous membrane, then performing a drying process, finally obtaining the separator.

The preparation method of the separator according to the second aspect of the present disclosure is simple and easy to use, the industrial production is easily realized.

In the preparation method of the separator according to the second aspect of the present disclosure, the solvent may be denioned water. Using the deionized water as the solvent is not only safe and environment-friendly, but also reduces the production cost.

In the preparation method of the separator according to the second aspect of the present disclosure, the coating method may be gravure printing or extrusion coating.

Next a lithium-ion secondary battery according to a third aspect of the present disclosure will be described.

A lithium-ion secondary battery according to a third aspect of the present disclosure comprises: a positive electrode plate; a negative electrode plate; a separator interposed between the positive electrode plate and the negative electrode plate; and an electrolyte. The separator is the separator according to the first aspect of the present disclosure.

Then examples and comparative examples of separators and lithium-ion secondary batteries and a preparation method thereof according to the present disclosure will be described.

Example 1

1. Preparation of a Separator (1) Polymer particles (styrene-ethyl methacrylate copolymer with a particle diameter of 50 nm, a glass transition temperature of 98° C. and a decomposition temperature of 310° C., and a pore size of a nanopore of the polymer particle was 10 nm, a porosity of a shell was 10%, a ratio of the pore size of the nanopore and a thickness of the shell was 50%) and binder particles (acrylic latex with a particle diameter of 60 nm) according to a mass ratio of 98:2 were uniformly mixed with a solvent (denioned water) to form a coating slurry;

(2) the coating slurry was coated on one surface of a microporous membrane (a polyethylene (PE) membrane with a thickness of 9 μm, a pore size of 35 nm of a micropore and a porosity of 30%) via a method of gravure printing, and the separator was obtained after a drying process, a volume ratio of the polymer particle embedded into the micropore of the microporous membrane was 5.5%, a thickness of the coating was 4 μm.

2. Preparation of a Positive Electrode Plate of a Lithium-Ion Secondary Battery

Active material (lithium cobaltate ($LiCoO_2$)), adhesive (polyvinylidene fluoride (PVDF)), conductive agent (conductive carbon black) according to a mass ratio of 95:3:2 were uniformly mixed with a solvent (NMP) to form a positive electrode slurry, a solid content of the positive electrode slurry was 40%, then the positive electrode slurry was uniformly coated on two surfaces of a current collector (an aluminum foil with a thickness of 12 μm), which was followed by drying, cold pressing, cutting, welding a tab, and finally a positive electrode plate of the lithium-ion secondary battery was obtained.

3. Preparation of a Negative Electrode Plate of a Lithium-Ion Secondary Battery

Active material (artificial graphite), thickening agent (sodium carboxymethyl cellulose), conductive agent (conductive carbon black), adhesive (styrene-butadiene latex) according to a mass ratio of 95:1.5:1.5:2 were uniformly mixed with a solvent (denioned water) to form a negative electrode slurry, a solid content of the negative electrode slurry was 50%, then the negative electrode slurry was uniformly coated on two surfaces of a current collector (a copper foil with a thickness of 8 μm), which was followed by drying, cold pressing, cutting, welding a tab, and finally a negative electrode plate of the lithium-ion secondary battery was obtained.

4. Preparation of a Lithium-Ion Secondary Battery

The positive electrode plate, the negative electrode plate and the separator were wound together to form a cell, which was followed by packaging, injecting an electrolyte (a solution containing $LiPF_6$ with a concentration of 1 mol/L and a non-water organic solvent which was a mixture of EC, PC and DEC according to a mass ratio of 30:35:35), formation, degassing and molding, finally a lithium-ion secondary battery was obtained.

Example 2

1. Preparation of a Separator (1) Polymer particles (styrene-ethyl methacrylate copolymer with a particle diameter of 50 nm, a glass transition temperature of 98° C. and a decomposition temperature of 310° C., and a pore size of a nanopore of the polymer particle was 10 nm, a porosity of a shell was 10%, a ratio of the pore size of the nanopore and a thickness of the shell was 50%) and binder particles (acrylic latex with a particle diameter of 60 nm) according to a mass ratio of 98:2 were uniformly mixed with a solvent (denioned water) to form a coating slurry;

(2) the coating slurry was coated on one surface of a microporous membrane (a polyethylene (PE) membrane with a thickness of 9 μm, a pore size of 45 nm of a micropore and a porosity of 30%) via a method of gravure printing, and the separator was obtained after a drying process, a volume ratio of the polymer particle embedded into the micropore of the microporous membrane was 19.4%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 2 was used.

Example 3

1. Preparation of a Separator (1) Polymer particles (styrene-ethyl methacrylate copolymer with a particle diameter of 50 nm, a glass transition temperature of 98° C. and a decomposition temperature of 310° C., and a pore size of a nanopore of the polymer particle was 10 nm, a porosity of a shell was 10%, a ratio of the pore size of the nanopore and a thickness of the shell was 50%) and binder particles (acrylic latex with a particle diameter of 60 nm) according to a mass ratio of 98:2 were uniformly mixed with a solvent (denioned water) to form a coating slurry;

(2) the coating slurry was coated on one surface of a microporous membrane (a polyethylene (PE) membrane with a thickness of 9 μm, a pore size of 49 nm of a micropore and a porosity of 30%) via a method of gravure printing, and the separator was obtained after a drying process, a volume ratio of the polymer particle embedded into the microporous membrane the micropore of was 35.3%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 3 was used.

Example 4

1. Preparation of a Separator (1) Polymer particles (styrene-ethyl methacrylate copolymer with a particle diameter of 50 nm, a glass transition temperature of 98° C. and a decomposition temperature of 310° C., and a pore size of a nanopore of the polymer particle was 10 nm, a porosity of a shell was 10%, a ratio of the pore size of the nanopore and a thickness of the shell was 50%) and binder particles (acrylic latex with a particle diameter of 90 nm) according to a mass ratio of 70:30 were uniformly mixed with a solvent (denioned water) to form a coating slurry;

(2) the coating slurry was coated on one surface of a microporous membrane (a polyethylene (PE) membrane with a thickness of 3 μm, a pore size of 49 nm of a micropore, a porosity of 30%) via a method of gravure printing, and the separator was obtained after a drying process, a volume ratio of the polymer particle embedded into the micropore of the microporous membrane was 35.3%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 4 was used.

Example 5

1. Preparation of a Separator (1) Polymer particles (styrene-methyl methacrylate copolymer with a particle diameter of 65 nm, a glass transition temperature of 110° C. and a decomposition temperature of 330° C., and a pore size of a nanopore of the polymer particle was 15 nm, a porosity of a shell was 20%, a ratio of the pore size of the nanopore and a thickness of the shell was 33%) and binder particles (styrene-acrylate latex with a particle diameter of 80 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 7 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 2 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 5 was used.

Example 6

1. Preparation of a Separator (1) Polymer particles (styrene-methyl methacrylate copolymer with a particle diameter of 75 nm, a glass transition temperature of 110° C. and a decomposition temperature of 330° C., and a pore size of a nanopore of the polymer particle was 15 nm, a porosity of a shell was 20%, a ratio of the pore size of the nanopore and a thickness of the shell was 33%) and binder particles (styrene-acrylate latex with a particle diameter of 80 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 7 μm, a pore size of 65 nm of a micropore and a porosity of 38%) via a method of gravure printing, and the separator was obtained after a drying process, a volume ratio of the polymer particle embedded into the micropore of the microporous membrane was 15.7%, a thickness of the coating was 2 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 6 was used.

Example 7

1. Preparation of a Separator (1) Polymer particles (styrene-methyl methacrylate copolymer with a particle diameter of 75 nm, a glass transition temperature of 110° C. and a decomposition temperature of 330° C., and a pore size of a nanopore of the polymer particle was 15 nm, a porosity of a shell was 20%, a ratio of the pore size of the nanopore and a thickness of the shell was 33%) and binder particles (styrene-acrylate latex with a particle diameter of 80 nm) according to a mass ratio of 94:6 were uniformly mixed with a solvent (denioned water) to form a coating slurry;

(2) the coating slurry was coated on one surface of a microporous membrane (a polyethylene membrane with a thickness of 7 μm, a pore size of 70 nm of a micropore and a porosity of 38%) via a method of gravure printing, and the separator was obtained after a drying process, a volume ratio of the polymer particle embedded into the micropore of the microporous membrane was 24.2%, a thickness of the coating was 2 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 7 was used.

Example 8

1. Preparation of a Separator (1) Polymer particles (styrene-methyl methacrylate copolymer with a particle diameter of 100 nm, a glass transition temperature of 110° C. and a decomposition temperature of 330° C., and a pore size of a nanopore of the polymer particle was 15 nm, a porosity of a shell was 20%, a ratio of the pore size of the nanopore and a thickness of the shell was 33%) and binder particles (styrene-acrylate latex with a particle diameter of 80 nm) according to a mass ratio of 94:6 were uniformly mixed with a solvent (denioned water) to form a coating slurry; (2) the coating slurry was coated on one surface of a microporous membrane (a polyethylene (PE) membrane with a thickness of 7 μm, a pore size of 75 nm of a micropore and a porosity of 38%) via a method of gravure printing, and the separator was obtained after a drying process, a volume ratio of the polymer particle embedded into the micropore of the microporous membrane was 7.6%, a thickness of the coating was 2 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 8 was used.

Example 9

1. Preparation of a Separator (1) Polymer particles (styrene-cyclohexyl methacrylate copolymer with a particle diameter of 120 nm, a glass transition temperature of 95° C. and a decomposition temperature of 370° C., and a pore size of a nanopore of the polymer particle was 20 nm, a porosity of a shell was 35%, a ratio of the pore size of the nanopore and a thickness of the shell was 20%) and binder particles (styrene-butadiene latex with a particle diameter of 210 nm) according to a mass ratio of 94:6 were uniformly mixed with a solvent (denioned water) to form a coating slurry;

(2) the coating slurry was coated on one surface of a microporous membrane (a polypropylene (PP) membrane with a thickness of 16 μm, a pore size of 100 nm of a micropore and a porosity of 43%) via a method of gravure printing, and the separator was obtained after a drying process, a volume ratio of the polymer particle embedded into the micropore of the microporous membrane was 12.8%, a thickness of the coating was 6 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 9 was used.

Example 10

1. Preparation of a Separator (1) Polymer particles (styrene-cyclohexyl methacrylate copolymer with a particle diameter of 165 nm, a glass transition temperature of 95° C. and a decomposition temperature of 370° C., and a pore size of a nanopore of the polymer particle was 20 nm, a porosity of a shell was 35%, a ratio of the pore size of the nanopore and a thickness of the shell was 20%) and binder particles (styrene-butadiene latex with a particle diameter of 210 nm) according to a mass ratio of 94:6 were uniformly mixed with a solvent (denioned water) to form a coating slurry;

(2) the coating slurry was coated on one surface of a microporous membrane (a polypropylene (PP) membrane with a thickness of 16 μm, a pore size of 150 nm of a micropore and a porosity of 43%) via a method of gravure printing, and the separator was obtained after a drying process, a volume ratio of the polymer particle embedded into the micropore of the microporous membrane was 20.6%, a thickness of the coating was 6 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 10 was used.

Example 11

1. Preparation of a Separator (1) Polymer particles (styrene-cyclohexyl methacrylate copolymer with a particle diameter of 230 nm, a glass transition temperature of 95° C. and a decomposition temperature of 370° C., and a pore size of a nanopore of the polymer particle was 20 nm, a porosity of a shell was 35%, a ratio of the pore size of the nanopore and a thickness of the shell was 20%) and binder particles (styrene-butadiene latex with a particle diameter of 210 nm) according to a mass ratio of 94:6 were uniformly mixed with a solvent (denioned water) to form a coating slurry;

(2) the coating slurry was coated on one surface of a microporous membrane (a polypropylene (PP) membrane with a thickness of 16 μm, a pore size of 200 nm of micropore and a porosity of 43%) via a method of gravure printing, and the separator was obtained after a drying process, a volume ratio of the polymer particle embedded into the micropore of the microporous membrane was 16.0%, a thickness of the coating was 6 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 11 was used.

Example 12

1. Preparation of a Separator (1) Polymer particles (styrene-acrylic acid copolymer with a particle diameter of 260 nm, a glass transition temperature of 105° C. and a decomposition temperature of 350° C., and a pore size of a nanopore of the polymer particle was 30 nm, a porosity of a shell was 50%, a ratio of the pore size of the nanopore and a thickness of the shell was 20%) and binder particles (acrylic latex with a particle diameter of 300 nm) according to a mass ratio of 94:6 were uniformly mixed with a solvent (denioned water) to form a coating slurry;

(2) the coating slurry was coated on one surface of a microporous membrane (a polypropylene/polyethylene/polypropylene (PP/PE/PP) composite membrane with a thickness of 20 μm, a pore size of 250 nm of a micropore and a porosity of 50%) via a method of gravure printing, and the separator was obtained after a drying process, a volume ratio of the polymer particle embedded into the micropore of the microporous membrane was 29.9%, a thickness of the coating was 0.5 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 12 was used.

Example 13

1. Preparation of a Separator (1) Polymer particles (methacrylic acid-methyl methacrylate copolymer with a particle diameter of 450 nm, a glass transition temperature of 120° C. and a decomposition temperature of 380° C., and a pore size of a nanopore of the polymer particle was 30 nm, a porosity of a shell was 20%, a ratio of the pore size of the nanopore and a thickness of the shell was 20%) and binder particles (acrylic latex with a particle diameter of 450 nm) according to a mass ratio of 94:6 were uniformly mixed with a solvent (denioned water) to form a coating slurry;

(2) the coating slurry was coated on one surface of a microporous membrane (a polyethylene terephthalate (PET) membrane with a thickness of 25 μm, a pore size of 400 nm of a micropore and a porosity of 75%) via a method of gravure printing, and the separator was obtained after a drying process, a volume ratio of the polymer particle embedded into the micropore of the microporous membrane was 18.0%, a thickness of the coating was 0.5 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 13 was used.

Example 14

1. Preparation of a Separator (1) Polymer particles (methyl styrene-methyl methacrylate copolymer with a particle diameter of 800 nm, a glass transition temperature of 123° C. and a decomposition temperature of 400° C., and a pore size of a nanopore of the polymer particle was 30 nm, a porosity of a shell was 11%, a ratio of the pore size of the nanopore and a thickness of the shell was 20%) and binder particles (acrylic latex with a particle diameter of 850 nm) according to a mass ratio of 94:6 were uniformly mixed with a solvent (denioned water) to form a coating slurry;

(2) the coating slurry was coated on one surface of a microporous membrane (a polyimide (PI) membrane with a thickness of 35 μm, a pore size of 799 nm of a micropore and a porosity of 75%) via a method of gravure printing, and the separator was obtained after a drying process, a volume ratio of the polymer particle embedded into the micropore of the microporous membrane was 46.3%, a thickness of the coating was 0.5 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 14 was used.

Example 15

1. Preparation of a Separator (1) Polymer particles (vinyl toluene-ethyl methacrylate copolymer with a particle diameter of 900 nm, a glass transition temperature of 125° C. and a decomposition temperature of 420° C., and a pore size of a nanopore of the polymer particle was 30 nm, a porosity of a shell was 10%, a ratio of the pore size of the nanopore and a thickness of the shell was 20%) and binder particles (acrylic latex with a particle diameter of 1000 nm) according to a mass ratio of 94:6 were uniformly mixed with a solvent (denioned water) to form a coating slurry;

(2) the coating slurry was coated on one surface of a microporous membrane (a cellulose membrane with a thickness of 25 μm, a pore size of 800 nm of a micropore and a porosity of 75%) via a method of gravure printing, and the separator was obtained after a drying process, a volume ratio of the polymer particle embedded into the micropore of the microporous membrane was 18.0%, a thickness of the coating was 0.5 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 15 was used.

Example 16

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 15 nm, a porosity of a shell was 27%, a ratio of the pore size of the nanopore and a thickness of the shell was 33%) and binder particles (acrylic latex with a particle diameter of 75 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 16 was used.

Example 17

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 15 nm, a porosity of a shell was 27%, a ratio of the pore size of the nanopore and a thickness of the shell was 33%) and binder particles (acrylic latex with a particle diameter of 150 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore, a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 17 was used.

Example 18

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 15 nm, a porosity of a shell was 27%, a ratio of the pore size of the nanopore and a thickness of the shell was 33%) and binder particles (acrylic latex with a particle diameter of 200 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 18 was used.

Example 19

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 10 nm, a porosity of a shell was 12%, a ratio of the pore size of the nanopore and a thickness of the shell was 22%) and binder particles (acrylic latex with a particle diameter of 100 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 19 was used.

Example 20

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 10 nm, a porosity of the shell was 24%, a ratio of the pore size of the nanopore and a thickness of the shell was 22%) and binder particles (acrylic latex with a particle diameter of 100 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 20 was used.

Example 21

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 10 nm, a porosity of a shell was 50%, a ratio of the pore size of the nanopore and a thickness of the shell was 22%) and binder particles (acrylic latex with a particle diameter of 100 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 21 was used.

Example 22

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 10 nm, a porosity of a shell was 24%, a ratio of the pore size of the nanopore and a thickness of the shell was 20%) and binder particles (acrylic latex with a particle diameter of 100 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 22 was used.

Example 23

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 10 nm, a porosity of a shell was 24%, a ratio of the pore size of the nanopore and a thickness of the shell was 33%) and binder particles (acrylic latex with a particle diameter of 100 nm) according to a mass ratio of 94:6 were uniformly mixed with a solvent (denioned water) to form a coating slurry;

(2) the coating slurry was coated on one surfaces of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 23 was used.

Example 24

1. Preparation of a Separator (1) Polymer particles (styrene-ethyl methacrylate copolymer with a particle diameter of 65 nm, a glass transition temperature of 98° C. and a decomposition temperature of 310° C., and a pore size of a nanopore of the polymer particle was 10 nm, a porosity of a shell was 24%, a ratio of the pore size of the nanopore and a thickness of the shell was 50%) and binder particles (acrylic latex with a particle diameter of 100 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 60 nm of a micropore and a porosity of 38%) via a method of gravure printing, and the separator was obtained after a drying process, a volume ratio of the polymer particle embedded into the micropore of the microporous membrane was 22.6%, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in example 24 was used.

Comparative Example 1

1. Preparation of a Separator

The separator was the polyethylene (PE) membrane in example 1 with the thickness of 9 μm, the porosity of 30% and the pore size of 35 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 1 was used.

Comparative Example 2

1. Preparation of a Separator (1) Aluminum oxide particles with a particle diameter of 230 nm and a decomposition temperature of 2800° C. and binder particles (acrylic latex with a particle diameter of 75 nm) according to a mass ratio of 94:6 were uniformly mixed with a solvent (denioned water) to form a coating slurry;

(2) the coating slurry was coated on one surface of a microporous membrane (a polyethylene (PE) membrane with a thickness of 9 μm, a pore size of 35 nm of a micropore and a porosity of 30%) via a method of gravure printing, and the separator was obtained after a drying process, a thickness of the coating was 4 μm.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 2 was used.

Comparative Example 3

1. Preparation of a Separator

The separator was the polyethylene (PE) membrane in example 5 with the thickness of 7 μm, the porosity of 38% and the pore size of 60 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 3 was used.

Comparative Example 4

1. Preparation of a Separator

The separator was the polypropylene (PP) membrane in example 9 with the thickness of 16 μm, the porosity of 43% and a pore size of 100 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 4 was used.

Comparative Example 5

1. Preparation of a Separator

The separator was the polypropylene/polyethylene/polypropylene (PP/PE/PP) composite membrane in example 12 with the thickness of 20 μm, the porosity of 50% and the pore size of 250 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 5 was used.

Comparative Example 6

1. Preparation of a Separator

The separator was the polyethylene terephthalate (PET) membrane in example 13 with the thickness of 25 μm, the porosity of 75% and the pore size of 400 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 6 was used.

Comparative Example 7

1. Preparation of a Separator

The separator was the polyimide (PI) membrane in example 14 with the thickness of 35 μm, the porosity of 75%, the pore size of 799 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 7 was used.

Comparative Example 8

1. Preparation of a Separator

The separator was the cellulose membrane in example 15 with the thickness of 25 μm, the porosity of 75%, the pore size of 800 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 8 was used.

Comparative Example 9

1. Preparation of a Separator

The separator was the polyethylene (PE) membrane in example 16 with the thickness of 9 μm, the porosity of 38%, the pore size of 60 nm of the micropore, but without the coating process.

2. Preparation of a Positive Electrode Plate of a Lithium-Ion Secondary Battery

It was the same as that in example 1.

3. Preparation of a Negative Electrode Plate of a Lithium-Ion Secondary Battery

It was the same as that in example 1.

4. Preparation of a Lithium-Ion Secondary Battery

It was the same as that in example 1 except that the separator prepared in comparative example 9 was used.

Finally testing processes and results of lithium-ion secondary batteries and separators thereof according to the present disclosure will be described.

(1) Testing of Heat Shrinkage Ratio of the Separators

The separator was cut into a square sample with a length of 100 nm and a width of 100 mm which were respectively marked as a longitudinal direction (MD) and a transverse direction (TD), then the lengths were tested in MD direction and TD direction by a projector tester and respectively the lengths were marked as L1 and L2, then the separator was placed in a forced air oven at 130° C., then the separator was taken out one hour later, again lengths in MD direction and TD direction were tested by the projector tester and respectively the lengths were marked as L3 and L4.

Heat shrinkage ratio of the separator in MD direction=$(L1-L3)/L1\times 100\%$;

Heat shrinkage ratio of the separator in TD direction=$(L2-L4)/L2\times 100\%$.

(2) Testing of Obturator Temperature of the Separators

The separator was cut into a circular piece with a diameter of 15 mm, the separator was immersed into the electrolyte for 30 minutes firstly and then the separator was taken out, the separator was placed in a test clamp, the electrolyte was injected, the clamp was tightened, and then the clamp was placed in a temperature program-control oven, the temperature was set by the temperature program-control oven from 25° C. to 200° C., the temperature was recorded in a rising process with a thermometric indicator, and a resistance value of the separator was recorded with an electrochemical workstation, wherein the temperature corresponding to a surge of the resistance value was the obturator temperature of the separator.

(3) Testing of Ionic Conductivity of the Separators

The separator was cut into a circular piece with a diameter of 15 mm, and the separator was immersed into the electrolyte for 30 minutes firstly and then the separator was taken out, the separator was placed in a test clamp, the electrolyte was injected, the clamp was tightened, and then the resistance value of the separator was scanned by the electrochemical workstation, five circular pieces for the separator was tested as one group and an impedance curve of the separator was obtained, and the ionic conductivity of the separator was fitted from the impedance curve of the separator.

(4) Testing of Liquid Absorption Amount of the Separators

The separator was cut into a square sample with a length of 100 nm and a width of 100 mm, the separator was weighted, and then the separator was immersed into the electrolyte for 30 minutes, then the separator was taken out and the electrolyte was absorbed on the surface of the separator by a pipetting paper, the separator was weighted again, wherein the difference between the two weights of the separator was the liquid absorption amount of the separator.

(5) Testing of Adhesive Force Between the Coating and the Microporous Membrane of the Separators The separator was cut into a rectangle sample with a length of 20 mm and a width of 10 mm, one surface of the separator with a coating was adhered on a test substrate via a double-sided adhesive tape and 10 mm was exposed out (i.e. 10 mm of the separator was not adhered on the test substrate along the longitudinal direction of the cut separator), the separator was flatted, and then the substrate was clamped on a lower fixture of a tensile tester, the exposed 10 mm of the separator was clamped on a upper fixture, then the upper fixture was fixed in a mold of the tensile tester and 180° peel force at a speed of 50 mm/min was tested to allow the coating to be peeled off from the surface of the microporous membrane, the value of peel force recorded in real time was recorded by the tensile tester, the mean value of the peel force during the peeling process was taken as the peeling force F (unit: N) of the separator, the adhesive force between the coating and the microporous membrane=F/sample width.

(6) Testing of Overcharge Performance of the Lithium-Ion Secondary Batteries

The lithium-ion secondary battery was put into a battery tester at 25° C., the lithium-ion secondary battery was charged to 10V at a constant current of 1 C and maintained for 30 mins, the temperature of the lithium-ion secondary battery was recorded at this time to judge whether the lithium-ion secondary battery was fired or exploded.

(7) Testing of Discharge Performance at Low Temperature of the Lithium-Ion Secondary Batteries The lithium-ion secondary battery was put into a battery tester, the lithium-ion secondary battery was charged to 4.35V at a constant current of 0.5 C at 25° C., then the lithium-ion secondary battery was discharged to 3.0V at a constant current of 0.5 C under different temperatures of −20° C., −10° C., 0° C., 10° C., and 25° C., the discharging capacity of the lithium-ion secondary battery was recorded to calculate the capacity retention rate of the lithium-ion secondary battery of different temperatures with taking the discharge capacity of the lithium-ion secondary battery of 25° C. as reference.

(8) Testing of Rate Performance of the Lithium-Ion Secondary Batteries

The lithium-ion secondary battery was put into a battery tester, the lithium-ion secondary battery was charged to 4.35V at a constant current of 0.5 C at 25° C., then the lithium-ion secondary battery was discharged to 3.0V at different currents of 0.2 C, 0.5 C, 1 C, and 2 C, the discharging capacity of the lithium-ion secondary battery was recorded to calculate the capacity retention rate of the lithium-ion secondary battery of different discharging currents with taking the discharge capacity of the lithium-ion secondary battery of 0.2 C as reference.

(9) Testing of Room Temperature Cycle Performance of the Lithium-Ion Secondary Batteries At 25° C., the lithium-ion secondary battery was charged to 4.35V at a constant current of 0.7 C, then the lithium-ion secondary battery was charged to 0.05 C at a constant voltage of 4.35V, then the lithium-ion secondary battery was discharged to 3.0V at a constant current of 1 C, which was a charge-discharge cycle, the charge-discharge cycle was repeated for 500 times.

Capacity retention rate after $N^{th}$ cycles=discharge capacity of the $N^{th}$ cycle/discharge capacity of the first cycle×100%.

Table 1 illustrated parameters of the separators of examples 1-24 and comparative examples 1-9.

Table 2 illustrated test results of the separators of examples 1-24 and comparative examples 1-9.

Table 3 illustrated test results of the lithium-ion secondary batteries of example 1, comparative example 1 and comparative example 2. Three pieces for each lithium-ion secondary battery were tested in each group, numbers of the lithium-ion secondary batteries of example 1 were S1-1, S1-2, S1-3, numbers of lithium-ion secondary batteries of comparative example 1 were D1-1, D1-2, D1-3, numbers of lithium-ion secondary batteries of comparative example 2 were D2-1, D2-2, D2-3.

Hereafter analyses of testing results of the separators and the lithium-ion secondary batteries were described.

Firstly analyses of testing results of the separators were described.

It could be seen from a comparison between example 1 and comparative example 1, the propersities of the separator of the present disclosure which was coated with the coating containing the polymer particles and the binder particles were obviously better than the propersities of the separator of comparative example 1 which was not coated with the coating. For example 1, the heat shrinkage ratio of the separator was relatively small, the obturator temperature was relatively low, the ionic conductivity and the liquid absorption amount were all relatively large. Similar results could be seen from a comparison between example 5 and comparative example 3, a comparison between example 9 and comparative example 4, a comparison between example 12 and comparative example 5, a comparison between example 13 and comparative example 6, a comparison between example 14 and comparative example 7, a comparison between example 15 and comparative example 8, and a comparison between example 16 and comparative example 9.

It could be seen from a comparison between example 1 and comparative example 2, the propersities of the separator of the present disclosure which was coated with the coating containing the polymer particles and the binder particles were obviously better than the propersities of the separator of comparative example 2 which was coated with the coating containing the aluminum oxide particles.

It could be seen from a comparison among examples 1-3, as the pore size of the micropore of the polyethylene membrane was increased, the volume ratio of the polymer particle with a same particle diameter embedded into the micropore on the surface of the microporous membrane was increased, and the heat shrinkage ratio of the separator was increased, the adhesive force between the coating and the microporous membrane of the separator was increased, the ionic conductivity of the separator was first increased and then decreased, the liquid absorption amount was decreased. This was because the contact area between the nanopore on the surface of the polymer particle and the micropore on the surface of the microporous membrane was increased as the volume ratio of the polymer particle embedded into the micropore was increased, therefore the ionic conductivity of the separator was increased. However, if the volume ratio of the polymer particle embedded into the micropore was too large, the liquid retention performance of the micropore itself on the surface of the microporous membrane became decreased, therefore the ionic conductivity of the separator was decreased, so the volume ratio of polymer particle embedded into the micropore on the surface of the microporous membrane should be moderate.

It could be seen from a comparison between example 3 and example 4, the concent of the polymer particles of the coating of example 4 was smaller than the concent of the polymer particles of the coating of example 3, the heat shrinkage ratio of the separator of example 4 was larger than that of example 3, and the liquid absorption amount of the separator of example 4 was smaller than that in example 3. Furthermore, the adhesive force between the coating and the microporous membrane of the separator was increased as the content of the binder particles was increased.

The heat shrinkage ratio of examples 5-8 was slightly worse than that of examples 1-4 as a whole, but the ionic conductivity was slightly larger, this was because the thickness of the coating of examples 5-8 was smaller. It could be seen that, if the separator was required to achieve a better comprehensive performance, the thickness of the separator should be moderate. Furthermore, the volume ratio of the polymer particle embedded into the micropore should also be moderate. It could be seen from a comparison among examples 9-11, the thickness of the coating was 6 μm, so the liquid absorption amounts of the separators of the present disclosure which were coated with the coating containing the polymer particles and the binder particles were increased obviously.

It could be seen from a comparison among examples 16-18, as the particle diameter of the binder particle was increased, the adhesive force between the coating and the microporous membrane of the separator was decreased, but if the particle diameter of the binder particle was too small, it would block the nanopore on the surface of the polymer particle, and the liquid absorption amount and the ionic conductivity of the separator would be decreased.

It could be seen from a comparison among examples 19-21, the porosity of the surface of the shell of the polymer particle was increased, the ionic conductivity and the liquid absorption amount of the separator were increased, but the heat shrinkage ratio of the separator was also increased, therefore the thermal stability of the separator became worse.

It could be seen from a comparison among examples 22-24, the ratio of the pore size and the length of the channel (ie. the thickness of the shell) of the nanopore on the surface of the polymer particle was increased, the ionic conductivity and the liquid absorption amount of the separators were increased, but the heat shrinkage ratio of the separator was also increased, therefore the thermal stability of the separator became worse. This was because when the pore size of the nanopore was constant, if the ratio of the pore size and the length of the channel was larger (ie. the thickness of the shell got smaller), the electrolyte would more quickly enter into the cavity of the polymer particle, and the liquid absorption amount of the separator was larger within a certain time. But if the ratio of the pore size and the length of the channel was larger (ie. the thickness of the shell got smaller), the heat shrinkage ratio of the separator was larger, therefore the thermal stability of the separator became worse.

Hereafter analyses of testing results of the lithium-ion secondary batteries would be described.

It could be seen from Table 3, the lithium-ion secondary batteries of example 1 using the separator of the present disclosure which was coated with the coating containing the polymer particles and the binder particles all passed the overcharging test. And the lithium-ion secondary batteries of comparative example 1 using the separator which was not coated with the coating were fired after 15 min~20 min, and did all not pass the overcharging test. And only one of the lithium-ion secondary batteries of comparative example 2 using the separator which was coated with the layer of aluminum oxide particles (ceramic particles) passed the overcharging test, the other two lithium-ion secondary batteries was fired respectively after 35 min and 38 min. This illustrated that safety performance of the lithium-ion secondary batteries using the separator which was coated with the coating containing the polymer particles and the binder particles had been greatly increased.

Low temperature discharge performance and rate performance of the lithium-ion secondary batteries of example 1 using the separator of the present disclosure which was coated with the coating containing the polymer particles and the binder particles were better than the lithium-ion secondary batteries of comparative example 1 using the separator which was not coated with the coating and the lithium-ion secondary batteries of comparative example 2 using the separator which was coated with the layer of aluminum oxide particles (ceramic particles). FIG. 1 was a diagram illustrating room temperature cycle performance of the lithium-ion secondary batteries of example 1, comparative example 1 and comparative example 2. In FIG. 1, the capacity retention rate of example 1 was an average value of the capacity retention rate of the lithium-ion secondary batteries numbered as S1-1, S1-2 and S1-3, the capacity retention rate of comparative example 1 was an average value of the capacity retention rate of the lithium-ion secondary batteries numbered as D1-1, D1-2 and D1-3, the capacity retention rate of comparative example 2 was an average value of the capacity retention rate of the lithium-ion secondary batteries numbered as D2-1, D2-2 and D2-3. It could be seen from FIG. 1, room temperature cycle performance of example 1 using the separator which was coated with the coating containing the polymer particles and the binder particles was obviously better than that of comparative example 1 using the separator which was not coated with the coating and that of comparative example 2 using the separator which was coated with the layer of aluminum oxide particles (ceramic particles). This was because the separator of the present disclosure which was coated with the coating containing the polymer particles and the binder particles might improve the liquid retention amount on electrolyte, therefore room temperature cycle performance of the lithium-ion secondary battery using the separator was much better, and could meet the requirement of a longer cycle life of the lithium-ion secondary battery.

In conclusion, the separator of the present disclosure has a higher liquid absorption amount and a higher ionic conductivity and a lower thermal shrinkage ratio, the lithium-ion secondary battery of the present disclosure has a longer cycle life, a better low temperature discharge performance, a better rate performance, and a better safety performance.

TABLE 1

Parameters of separators of examples 1-24 and comparative examples 1-9

| | microporous membrane | | | | coating polymer particle | | | | |
|---|---|---|---|---|---|---|---|---|---|
| | material | thickness (μm) | porosity (%) | pore size (nm) | material | content (%) | Tg (° C.) | decomposition temperature (° C.) | particle diameter (nm) |
| Example 1 | PE | 9 | 30 | 35 | styrene-ethyl methacrylate copolymer | 98 | 98 | 310 | 50 |
| Example 2 | PE | 9 | 30 | 45 | styrene-ethyl methacrylate copolymer | 98 | 98 | 310 | 50 |
| Example 3 | PE | 9 | 30 | 49 | styrene-ethyl methacrylate copolymer | 98 | 98 | 310 | 50 |
| Example 4 | PE | 3 | 30 | 49 | styrene-ethyl methacrylate copolymer | 70 | 98 | 310 | 50 |
| Example 5 | PE | 7 | 38 | 60 | styrene-methyl methacrylate copolymer | 94 | 110 | 330 | 65 |
| Example 6 | PE | 7 | 38 | 65 | styrene-methyl methacrylate copolymer | 94 | 110 | 330 | 75 |
| Example 7 | PE | 7 | 38 | 70 | styrene-methyl methacrylate copolymer | 94 | 110 | 330 | 75 |
| Example 8 | PE | 7 | 38 | 75 | styrene-methyl methacrylate copolymer | 94 | 110 | 330 | 100 |
| Example 9 | PP | 16 | 43 | 100 | styrene-cyclohexyl methacrylate copolymer | 94 | 95 | 370 | 120 |
| Example 10 | PP | 16 | 43 | 150 | styrene-cyclohexyl methacrylate copolymer | 94 | 95 | 370 | 165 |
| Example 11 | PP | 16 | 43 | 200 | styrene-cyclohexyl methacrylate copolymer | 94 | 95 | 370 | 230 |
| Example 12 | PP/PE/PP | 20 | 50 | 250 | styrene-acrylic acid copolymer | 94 | 105 | 350 | 260 |
| Example 13 | PET | 25 | 75 | 400 | methacrylic acid-methyl methacrylate copolymer | 94 | 120 | 380 | 450 |
| Example 14 | PI | 35 | 75 | 799 | methyl styrene-methyl methacrylate copolymer | 94 | 123 | 400 | 800 |
| Example 15 | cellulose | 25 | 75 | 800 | vinyl toluene-ethyl methacrylate copolymer | 94 | 125 | 420 | 900 |
| Example 16 | PE | 9 | 38 | 60 | styrene-ethyl methacrylate copolymer | 94 | 98 | 310 | 65 |
| Example 17 | PE | 9 | 38 | 60 | styrene-ethyl methacrylate copolymer | 94 | 98 | 310 | 65 |
| Example 18 | PE | 9 | 38 | 60 | styrene-ethyl methacrylate copolymer | 94 | 98 | 310 | 65 |
| Example 19 | PE | 9 | 38 | 60 | styrene-ethyl methacrylate copolymer | 94 | 98 | 310 | 65 |
| Example 20 | PE | 9 | 38 | 60 | styrene-ethyl methacrylate copolymer | 94 | 98 | 310 | 65 |
| Example 21 | PE | 9 | 38 | 60 | styrene-ethyl methacrylate copolymer | 94 | 98 | 310 | 65 |

TABLE 1-continued

Parameters of separators of examples 1-24 and comparative examples 1-9

| | | | | | | | | | |
|---|---|---|---|---|---|---|---|---|---|
| Example 22 | PE | 9 | 38 | 60 | styrene-ethyl methacrylate copolymer | 94 | 98 | 310 | 65 |
| Example 23 | PE | 9 | 38 | 60 | styrene-ethyl methacrylate copolymer | 94 | 98 | 310 | 65 |
| Example 24 | PE | 9 | 38 | 60 | styrene-ethyl methacrylate copolymer | 94 | 98 | 310 | 65 |
| Comparative example 1 | PE | 9 | 30 | 35 | / | / | / | / | / |
| Comparative example 2 | PE | 9 | 30 | 35 | aluminum oxide | 94 | / | 2800 | 230 |
| Comparative example 3 | PE | 7 | 38 | 60 | / | / | / | / | / |
| Comparative example 4 | PP | 16 | 43 | 100 | / | / | / | / | / |
| Comparative example 5 | PP/PE/PP | 20 | 50 | 250 | / | / | / | / | / |
| Comparative example 6 | PET | 25 | 75 | 400 | / | / | / | / | / |
| Comparative example 7 | PI | 35 | 75 | 799 | / | / | / | / | / |
| Comparative example 8 | cellulose | 25 | 75 | 800 | / | / | / | / | / |
| Comparative example 9 | PE | 9 | 38 | 60 | / | / | / | / | / |

| | coating | | | | | | | |
|---|---|---|---|---|---|---|---|---|
| | polymer particle | | | | binder particle | | | |
| | volume ratio (%) | pore size (nm) | pore size/thickness of shell (%) | porosity of shell (%) | material | content (%) | particle diameter (nm) | thickness (μm) |
| Example 1 | 5.5 | 10 | 50 | 10 | acrylic latex | 2 | 60 | 4 |
| Example 2 | 19.4 | 10 | 50 | 10 | acrylic latex | 2 | 60 | 4 |
| Example 3 | 35.3 | 10 | 50 | 10 | acrylic latex | 2 | 60 | 4 |
| Example 4 | 35.3 | 10 | 50 | 10 | acrylic latex | 30 | 90 | 4 |
| Example 5 | 22.6 | 15 | 33 | 20 | styrene-acrylate latex | 6 | 80 | 2 |
| Example 6 | 15.7 | 15 | 33 | 20 | styrene-acrylate latex | 6 | 80 | 2 |
| Example 7 | 24.2 | 15 | 33 | 20 | styrene-acrylate latex | 6 | 80 | 2 |
| Example 8 | 7.6 | 15 | 33 | 20 | styrene-acrylate latex | 6 | 80 | 2 |
| Example 9 | 12.8 | 20 | 20 | 35 | styrene-butadiene latex | 6 | 210 | 6 |
| Example 10 | 20.6 | 20 | 20 | 35 | styrene-butadiene latex | 6 | 210 | 6 |
| Example 11 | 16.0 | 20 | 20 | 35 | styrene-butadiene latex | 6 | 210 | 6 |
| Example 12 | 29.9 | 30 | 20 | 50 | acrylic latex | 6 | 300 | 0.5 |
| Example 13 | 18.0 | 30 | 20 | 20 | acrylic latex | 6 | 450 | 0.5 |
| Example 14 | 46.3 | 30 | 20 | 11 | acrylic latex | 6 | 850 | 0.5 |
| Example 15 | 18.0 | 30 | 20 | 10 | acrylic latex | 6 | 1000 | 0.5 |

TABLE 1-continued

Parameters of separators of examples 1-24 and comparative examples 1-9

| | | | | | | | | |
|---|---|---|---|---|---|---|---|---|
| Example 16 | 22.6 | 15 | 33 | 27 | acrylic latex | 6 | 75 | 4 |
| Example 17 | 22.6 | 15 | 33 | 27 | acrylic latex | 6 | 150 | 4 |
| Example 18 | 22.6 | 15 | 33 | 27 | acrylic latex | 6 | 200 | 4 |
| Example 19 | 22.6 | 10 | 22 | 12 | acrylic latex | 6 | 100 | 4 |
| Example 20 | 22.6 | 10 | 22 | 24 | acrylic latex | 6 | 100 | 4 |
| Example 21 | 22.6 | 10 | 22 | 50 | acrylic latex | 6 | 100 | 4 |
| Example 22 | 22.6 | 10 | 20 | 24 | acrylic latex | 6 | 100 | 4 |
| Example 23 | 22.6 | 10 | 33 | 24 | acrylic latex | 6 | 100 | 4 |
| Example 24 | 22.6 | 10 | 50 | 24 | acrylic latex | 6 | 100 | 4 |
| Comparative example 1 | / | / | / | / | / | / | / | / |
| Comparative example 2 | / | / | / | / | acrylic latex | 6 | 75 | 4 |
| Comparative example 3 | / | / | / | / | / | / | / | / |
| Comparative example 4 | / | / | / | / | / | / | / | / |
| Comparative example 5 | / | / | / | / | / | / | / | / |
| Comparative example 6 | / | / | / | / | / | / | / | / |
| Comparative example 7 | / | / | / | / | / | / | / | / |
| Comparative example 8 | / | / | / | / | / | / | / | / |
| Comparative example 9 | / | / | / | / | / | / | / | / |

TABLE 2

Test results of separators of examples 1-24 and comparative examples 1-9

| | heat shrinkage ratio | | obturator temperature (° C.) | ionic conductivity (mS/cm) | liquid absorption amount in 30 min (g/cm³) | adhesive force (N/m) |
|---|---|---|---|---|---|---|
| | MD (%) | TD (%) | | | | |
| Example 1 | 3.5 | 2.5 | 103 | 1.00 | 0.50 | 25 |
| Example 2 | 4.0 | 2.8 | 103 | 1.30 | 0.49 | 35 |
| Example 3 | 4.5 | 3.5 | 103 | 0.95 | 0.45 | 40 |
| Example 4 | 4.5 | 4.0 | 103 | 0.95 | 0.40 | 100 |
| Example 5 | 4.5 | 3.0 | 115 | 1.50 | 0.35 | 38 |
| Example 6 | 4.6 | 3.1 | 115 | 1.20 | 0.32 | 32 |
| Example 7 | 4.6 | 3.2 | 115 | 1.40 | 0.33 | 38 |
| Example 8 | 4.8 | 3.5 | 115 | 0.80 | 0.35 | 30 |
| Example 9 | 3.5 | 0.5 | 100 | 0.90 | 0.85 | 29 |
| Example 10 | 3.2 | 0.6 | 100 | 1.20 | 0.82 | 30 |
| Example 11 | 3.5 | 0.7 | 100 | 1.10 | 0.85 | 29 |
| Example 12 | 3.5 | 0.5 | 110 | 1.20 | 0.90 | 24 |
| Example 13 | 1.0 | 0.1 | 125 | 1.30 | 1.25 | 25 |
| Example 14 | 1.0 | 0.1 | 125 | 1.30 | 1.20 | 20 |
| Example 15 | 1.0 | 0.1 | 130 | 1.30 | 1.20 | 25 |
| Example 16 | 4.5 | 3.0 | 103 | 1.10 | 0.38 | 50 |
| Example 17 | 4.5 | 3.0 | 103 | 1.30 | 0.40 | 30 |
| Example 18 | 4.5 | 3.0 | 103 | 1.40 | 0.45 | 18 |
| Example 19 | 4.0 | 2.5 | 103 | 1.10 | 0.40 | 32 |
| Example 20 | 4.3 | 3.0 | 103 | 1.30 | 0.45 | 33 |
| Example 21 | 4.8 | 3.7 | 103 | 1.40 | 0.55 | 32 |
| Example 22 | 4.0 | 2.5 | 103 | 1.10 | 0.40 | 33 |
| Example 23 | 4.8 | 3.5 | 103 | 1.30 | 0.45 | 34 |
| Example 24 | 5.5 | 4.5 | 103 | 1.40 | 0.55 | 33 |
| Comparative example 1 | 25.0 | 20.0 | 133 | 0.50 | 0.30 | / |
| Comparative example 2 | 4.5 | 2.5 | 133 | 0.80 | 0.38 | 25 |
| Comparative example 3 | 23.0 | 18.0 | 133 | 0.60 | 0.30 | / |
| Comparative example 4 | 15.0 | 1.5 | 155 | 0.60 | 0.50 | / |
| Comparative example 5 | 16.0 | 1.8 | 133 | 0.70 | 0.70 | / |
| Comparative example 6 | 1.5 | 0.5 | / | 1.20 | 0.80 | / |
| Comparative example 7 | 1.2 | 0.5 | / | 1.20 | 0.82 | / |
| Comparative example 8 | 1.5 | 0.8 | / | 1.20 | 0.80 | / |
| Comparative example 9 | 1.5 | 0.8 | / | 1.20 | 0.35 | / |

TABLE 3

Test results of lithium-ion secondary batteries of example 1, comparative example 1 and comparative example 2

| | | temperature | overcharge duration | | temperature after overcharge | capacity retention rate at different low temperatures | | | | capacity retention rate at different constant currents | | |
|---|---|---|---|---|---|---|---|---|---|---|---|---|
| | | (° C.) | (min) | fire | (° C.) | −20° C. | −10° C. | 0° C. | 10° C. | 0.5 C | 1 C | 2 C |
| Example 1 | S1-1 | 25 ± 2 | 60 | no | 95 | 75% | 85% | 95% | 98% | 99% | 95% | 90% |
| | S1-2 | 25 ± 2 | 60 | no | 98 | 75% | 86% | 94% | 97% | 99% | 95% | 90% |
| | S1-3 | 25 ± 2 | 60 | no | 100 | 75% | 86% | 95% | 96% | 99% | 95% | 90% |
| Comparative example 1 | D1-1 | 25 ± 2 | 18 | yes | 450 (fire) | 50% | 75% | 90% | 96% | 95% | 90% | 80% |
| | D1-2 | 25 ± 2 | 15 | yes | 470 (fire) | 51% | 76% | 91% | 95% | 95% | 90% | 82% |
| | D1-3 | 25 ± 2 | 20 | yes | 430 (fire) | 51% | 74% | 92% | 94% | 95% | 91% | 81% |
| Comparative example 2 | D2-1 | 25 ± 2 | 35 | yes | 380 (fire) | 55% | 78% | 92% | 96% | 96% | 92% | 83% |
| | D2-2 | 25 ± 2 | 60 | no | 102 | 56% | 79% | 93% | 95% | 95% | 91% | 84% |
| | D2-3 | 25 ± 2 | 38 | yes | 150 (fire) | 56% | 78% | 93% | 95% | 96% | 92% | 75% |

What is claimed is:

1. A separator, comprising:
a microporous membrane having micropores; and
a coating provided on a surface of the microporous membrane and comprising:
polymer particles, each polymer particle having a hollow shell structure and comprising a shell and a cavity positioned in the shell, an outer surface of the shell being distributed with nanopores which are communicated with the cavity, a particle diameter of the polymer particle being larger than a pore size of the micropore of the microporous membrane; and
binder particles, a particle diameter of each binder particle being larger than the pore size of the micropore of the microporous membrane.

2. The separator according to claim 1, wherein a thickness of the microporous membrane is 3 μm~35 μm; a thickness of the coating is 0.5 μm~6 μm.

3. The separator according to claim 1, wherein the polymer particle is formed by copolymerizing at least two monomers selected from styrene, acrylic acid, methacrylic acid, methyl styrene, vinyl toluene, methyl acrylate, isobutyl acrylate, n-octyl acrylate, vinyl acrylate, cyclohexyl methacrylate, 2-hydroxyethyl methacrylate, 2-hydroxypropyl methacrylate, n-butyl methacrylate, ethyl methacrylate, and methyl methacrylate.

4. The separator according to claim 1, wherein a glass transition temperature of the polymer particle is 95° C.~125° C.

5. The separator according to claim 1, wherein the pore size of the micropore of the microporous membrane is 35 nm~800 nm; the particle diameter of the polymer particle is 50 nm~900 nm; the particle diameter of the binder particle is 60 nm~1000 nm.

6. The separator according to claim 1, wherein the particle diameter of the polymer particle allows at least 5% and less than 50% of a volume of the polymer particle to be embedded into the micropore of the microporous membrane.

7. The separator according to claim 1, wherein an area of the nanopores distributed on the outer surface of the shell of the polymer particle is 10%~50% of the outer surface area of the shell.

8. The separator according to claim 1, wherein taking a thickness of the shell of the polymer particle as a length of a channel of the nanopore, the pore size of the nanopore is 20%~50% of the thickness of the shell of the polymer particle.

9. The separator according to claim 1, wherein the pore size of the nanopore is 10 nm~30 nm.

10. A lithium-ion secondary battery, comprising:
a positive electrode plate;
a negative electrode plate;
a separator interposed between the positive electrode plate and the negative electrode plate; and
an electrolyte;
the separator comprising:
a microporous membrane having micropores; and
a coating provided on a surface of the microporous membrane and comprising:
polymer particles, each polymer particle having a hollow shell structure and comprising a shell and a cavity positioned in the shell, an outer surface of the shell being distributed with nanopores which are communicated with the cavity, a particle diameter of the polymer particle being larger than a pore size of the micropore of the microporous membrane; and
binder particles, a particle diameter of each binder particle being larger than the pore size of the micropore of the microporous membrane.

11. The lithium-ion secondary battery according to claim 10, wherein a thickness of the microporous membrane is 3 μm~35 μm; a thickness of the coating is 0.5 μm~6 μm.

12. The lithium-ion secondary battery according to claim 10, wherein the polymer particle is formed by copolymerizing at least two monomers selected from styrene, acrylic acid, methacrylic acid, methyl styrene, vinyl toluene, methyl acrylate, isobutyl acrylate, n-octyl acrylate, vinyl acrylate, cyclohexyl methacrylate, 2-hydroxyethyl methacrylate, 2-hydroxypropyl methacrylate, n-butyl methacrylate, ethyl methacrylate, and methyl methacrylate.

13. The lithium-ion secondary battery according to claim 10, wherein a glass transition temperature of the polymer particle is 95° C.~125° C.

14. The lithium-ion secondary battery according to claim 10, wherein the pore size of the micropore of the microporous membrane is 35 nm~800 nm; the particle diameter of the polymer particle is 50 nm~900 nm; the particle diameter of the binder particle is 60 nm~1000 nm.

15. The lithium-ion secondary battery according to claim 10, wherein the particle diameter of the polymer particle allows at least 5% and less than 50% of a volume of the polymer particle to be embedded into the micropore of the microporous membrane.

16. The lithium-ion secondary battery according to claim 10, wherein an area of the nanopores distributed on the outer surface of the shell of the polymer particle is 10%~50% of the outer surface area of the shell.

17. The lithium-ion secondary battery according to claim 10, wherein taking a thickness of the shell of the polymer particle as a length of a channel of the nanopore, the pore size of the nanopore is 20%~50% of the thickness of the shell of the polymer particle.

18. The lithium-ion secondary battery according to claim 10, wherein the pore size of the nanopore is 10 nm~30 nm.

* * * * *